United States Patent
Hu et al.

(10) Patent No.: US 6,491,796 B1
(45) Date of Patent: Dec. 10, 2002

(54) SYNTHESIS OF PHTHALOCYANINES BY MICROWAVE IRRADIATION

(75) Inventors: Andrew Teh Hu, Hsin Chu (TW); Tsai-Wie Tseng, Tao Yuan Hsein (TW); Herng-Dar Hwu, Taoyuan Hsein (TW); Lung-chang Liu, Hsin Chu (TW); Chung-Chun Lee, Hsin-chu (TW); Ming-Chia Lee, Hsin-chu (TW); Jun-Rong Chen, Hsin-Chu (TW)

(73) Assignees: Agi Corporation, Tayuan Hsien (TW); National Tsing Hua University, Hsinchu (TW)

( * ) Notice: Subject to any disclaimer, the term of this patent is extended or adjusted under 35 U.S.C. 154(b) by 0 days.

(21) Appl. No.: 09/888,589

(22) Filed: Jun. 26, 2001

(51) Int. Cl.$^7$ .............................. C07C 1/00; B01D 5/00
(52) U.S. Cl. .............................. 204/157.71; 204/157.72
(58) Field of Search ....................... 204/157.71, 157.72

(56) References Cited

FOREIGN PATENT DOCUMENTS

RU           2045555 C1  * 10/1995

OTHER PUBLICATIONS

Shaabani et al., "Synthesis of Metallophthalocyanines Under Solvent–Free Conditions Using Microwave Irradiation", Iranian J. of Chem. & Chem. Eng., vol. 18, No. 2, pp. 104–107. month unavailable, 1999, Abstract only.*

Shaabani et al., "Synthesis of Metallophthalocyanines Under Solvent–Free Conditions Using Microwave Irradiation", J. Chem. Res., Synop., vol. 10, pp. 672–673. month unavailable, 1998, Abstract only.*

* cited by examiner

Primary Examiner—Edna Wong
(74) Attorney, Agent, or Firm—Rosenberg, Klein & Lee

(57) ABSTRACT

This invention provides a novel process for preparing soluble phthalocyanines by microwave irradiation in the absence of any organic solvent. Three different starting materials, i.e. t-butylphthalic anhydride, t-butyl phthalonitrile and metal-free $H_2Pc$ (tetra-t-butylphthalocyanine) have been adopted, respectively. The starting material with proper metal compound, such as chloride or acetate were irradiated in a commercial microwave oven for a period of 1 to 30 minutes at a power of 200~900 W. This process is noted to reduce drastically reaction time of MPc formation from 8~24 hours to 10~30 minutes due to its unique heating by microwave irradiation. Sandwiched type $MPc_2$ (such as Lu $Pc_2$) can be produced only through metal replacement from metal-free phthalocyanine by microwave irradiation.

5 Claims, 1 Drawing Sheet

SYNTHESIS OF PHTHALOCYANINES BY MICROWAVE IRRADIATION

BACKGROUND OF THE INVENTION

1. Field of the Invention Received

The present invention relates to a novel process for preparing soluble phthalocyanines by microwave irradiation in the absence of any organic solvents and represented by the general formula shown in FIG. 1 wherein R is an alkyl group such as t-butyl or an alkoxy group like pentoxy, and Mt is a metal or non-metal, like Co, Ni, Cu, Mg, Al, Pd, Sn, Tb, Lu, Ce, La, Zn, or H.

2. Description of the Related Prior Art

Phthalocyanines exhibit extremely good stability and photoelectric properties due to its unique chemical structure, and hence have been used widely. They are currently the largest consumed dyes and/or pigments in the world, and play a major role in the application for the high technology industry.

Phthalocyanines can be made into a film that in turn can be fabricated into an element by means of a variety of methods. Among those methods, the spin-coating has the lowest cost[1-2]. Films made from phthalocyanines have been applied over various fields such as photo-recording materials[3-4], gas sensors[5], electrochromic elements[6], non-linear optics (NLO)[7] and photocells[8].

The structural formula of phthalocyanines is given in FIG. 1, wherein R represents alkyl, t-butyl, or an alkoxy group like pentoxy, and Mt represents a central material of metal, like Co, Ni, Cu, Mg, Al, Pd, Sn, Tb, Ce, La, Zn, Lu or a metal-free material like H atom.

Microwave was developed from the radar during the Second World War. At that time, it was discovered that microwaves emitted from the radar were capable of drying large ceramic objects. The application of microwaves for the household electric commodities had been, however, since 1970. Nevertheless, in recent years, many studies have been devoted to exploring the feasibility of the application of microwaves on chemical reactions.

Microwave is an energy in the form of an electromagnetic wave. It is a non-ionization radiation that can induce the migration of electron and the rotation of dipole moment, and hence cause the motion of a molecule. Microwave heating is different from conventional heating method mostly in its mode of energy delivery. Traditional heating method delivers heat energy by conducting through a container containing the solution, and homogeneously distributes the heat to the solution and hence raising the temperature thereof. On the contrary, microwave heating delivers heat by radiation, and therefore, can heat reactants directly and accordingly promoting its efficiency.

Synthesis of phthalocyanine by microwave irradiation was first proposed by Ahmad Shaabani[12] in 1998 using a phthalic anhydride lacking a side group as the starting material. This method had, however, a disadvantage in that the phthalocyanine synthesized had a poor solubility. It is insoluble in almost every solvent other than concentrated sulfuric acid. In 1999, Cezar Ungurenasu[13] proposed a process for preparing phthalocyanine by microwave irradiation with phthalonitrile or diiminoisoindoline as the starting material. The product thus prepared had a defined solubility, however, it was disadvantageous in that the solvent must be involved in the reaction, i.e., it was not a dry preparation, and hence contained high production cost. Further, it differed from the scope claimed by the present invention.

The traditional syntheses of phthalocyanine, no matter what starting material is used, required a relatively long reaction time and a considerable high energy to provide sufficient kinetic energy to overcome the reaction kinetic barrier and hence, promote the collision probability and energy of molecules, which results in low efficiency. Accordingly, the object of the present invention is to provide a novel process for preparing phthalocyanine by microwave irradiation that can eliminate the above-described disadvantage associated with the traditional process. Consequently, it is possible to shorten the reaction time, and produce soluble phthalocyanines that can be used to fabricate elements by avoiding an expensive vacuum sputtering method, and thus, increasing its industrial practicability.

SUMMARY OF THE INVENTION

Figure 1:
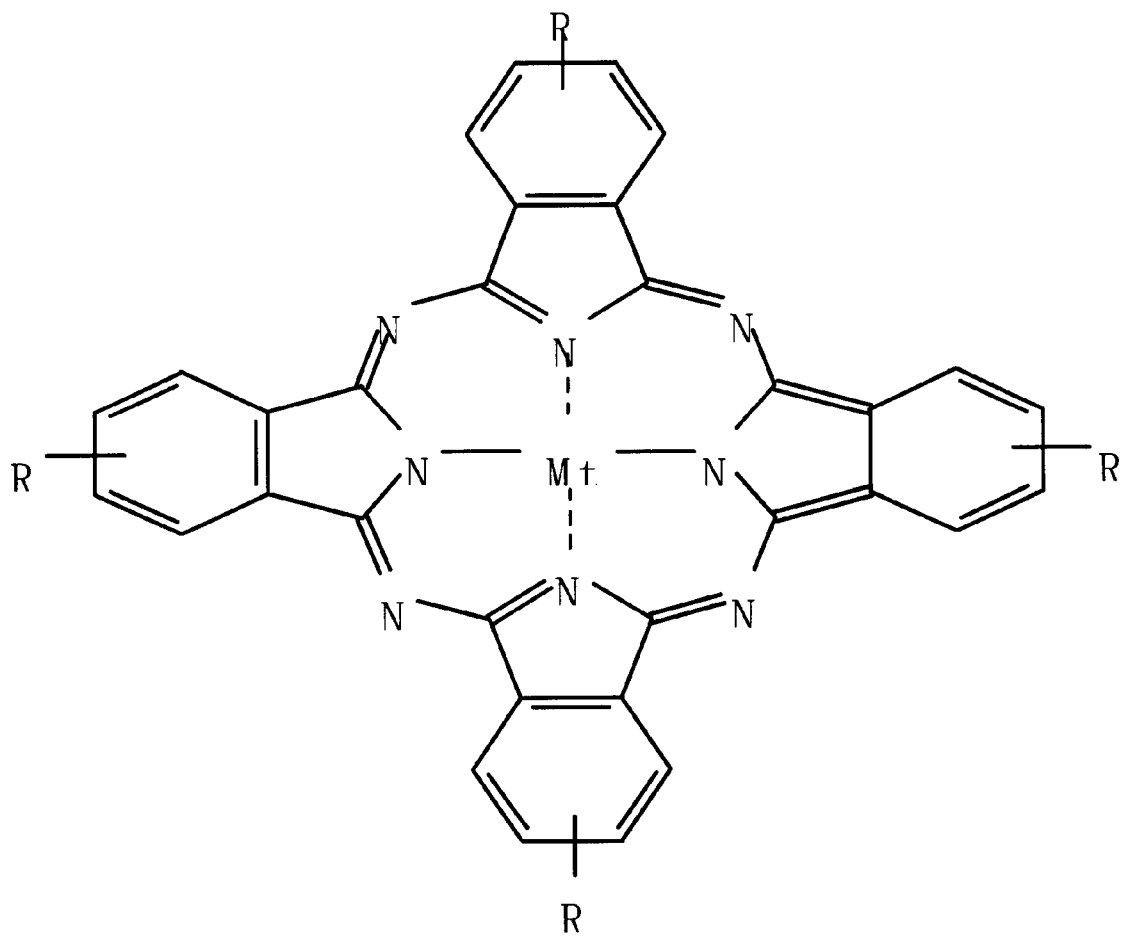
FIG. 1 is a representation of the prepared phthalocyanine by the general formula wherein R is an alkyl group such as t-butyl or an alkoxy group like pentoxy, and Mt is a metal or non-metal, like Co, Ni, Cu, Mg, Al, Pd, Sn, Tb, Lu, Ce, La, Zn, or H.

Accordingly, the invention provides a novel process for preparing soluble phthalocyanines by microwave irradiation. This process does not require a solvent and thus alleviates heat and increases the collision frequency and effective collision probability of reacting molecules, and hence increases the reaction yield and reaction rate. There are three different kinds of starting materials used for the preparation of soluble metal containing tetra-t-butyl phthalocyanines; (1) t-butyl-phthalic anhydride, (2) t-butyl-phthalonitrile, and (3) metal-free tetra-t-butyl-phthalocyanine $H_2Pc$.

DETAILED DESCRIPTION OF THE PREFERRED EMBODIMENT

The novel process for preparing phthalocyanine according to the invention comprises reacting the starting materials with various metal compounds in the absence of any solvent under microwave irradiation in a microwave oven. Metal chlorides and acetates are used as metal compounds.

The starting materials used herein can be any conventional starting material useful for preparing phthalocyanine, for example, phthalic anhydride, phthalonitrile and metal-free phthalocyanine.

In the process for preparing phthalocyanine by microwave irradiation, the starting reactants are placed in a heat-resistant quartz vessel of 10 ml. Next, the vessel is placed on the rotation table in the microwave oven. During the microwave irradiation, reactant molecules will have their dipole moments rotating in accordance with the change of the microwave field, and hence, increase collision frequency and effective collision probability, as described above. As a result, the reaction is accelerated and the reaction yield is promoted.

Thus, prepared phthalocyanine can be represented by the formula shown in FIG. 1 wherein R is an alkyl group such as t-butyl, or an alkoxy group like pentoxy;

Mt is a metal or non-metal, like Co, Ni, Cu, Mg, Al, Pd, Sn, Tb, Lu, Ce, La, Zn, or H atom.

The invention will be further illustrated in more detail by the following examples, but not limited by these descriptions.

EXAMPLES

Five examples are provided for illustrating the preferred embodiment of the novel process according to the invention. The invention is, however, not limited by these examples. Among these, Example 1 uses phthalic anhydride as the starting material; Examples 2 and 3 employ phthalonitrile as the starting materials. The center in the ring of Example 3 is a non-metal H atom. Example 4 and 5 use $H_2Pc$ as the starting material, whereby the central metal in Example 5 is the rare earth metal Lu, which forms a sandwich type of phthalocyanine that can be identified by mass spectrometry. It should be noted that Lu diphthalocyanine can only be prepared by using $H_2Pc$ as the starting material. All the examples are reacted in a microwave oven at a power of 200~900 W for a period of 1 to 30 minutes.

Example 1

Synthesis of Cu tetra-t-butyl-phthalocyanine using 4-tert-butyl-phthalic anhydride (4 g, 19.6 mmol), copper chloride (0.72 g, 5.45 mmol), urea (48 g, 0.8 mmol), ammonium chloride (4.048 g, 75.7 mmol) and ammonium molybdate (0.44 g, 2.23 mmol) were pulverized in a mortar, placed in a quartz vessel of 50 ml, and irradiated in a microwave oven at 440 W for 15 minutes. Thereafter, the reaction product was rinsed with demonized water, filtered under suction and dried under vacuum at 120° C.

500 ml of 2% HCl was added to the dried product and the resulting mixture was heated to boil for several minutes. After filtering and drying, it was added to a 500 ml of 1% aqueous NaOH solution, boiled for several minutes, filtered, and dried. The acid/base washing was repeated several times. The oven-dried crude product was dissolved in dichloromethane, and filtered with suction. The filtrate was concentrated under reduced pressure and dried in a vacuum to yield a bluish solid. The solid was recrystallized from ethanol and dichloromethane (5:1) to obtain Cu phthalocyanine with a yield of 47%.

IR(KBr); 2962, 2896, 2855, 1616, 1528, 1484, 1365, 1338, 1256, 1195, 1145, 1082, 1056, 923, 828, 745, 688, 553 $cm^{-1}$. MS: m/z 800($M^+$). UV-Vis (n-hexane)$\lambda_{max}$: 670 nm.

Example 2

Synthesis of Mg Tetra-t-butyl-phthalocyanine Using 4-Tert-butyl-phthalonitrile 4-tert-butyl-phthalonitrile (0.5 g, 2.72 mmol) and magnesium chloride (0.0645 g, 1.36 mmol) were ground homogeneously and the resulting mixture was placed in a quartz vessel. After addition of 5 ml, 1,8-diazabicyclo[5.4.0]undec-7-ene (DBU), the quartz vessel was irradiated in a microwave oven at 440 W for 10 minutes. A mixture of toluene and water (1:2 v/v) was added to precipitate the product. After filtering and drying, the product was Soxhlet extracted with methanol. 0.4380 g of Mg phthalocyanine was obtained. The yield was 85%.

IR (KBr); 2954, 1640, 1481, 1441, 1361, 1320, 1253, 1196, 1145, 1081, 1042, 916, 826, 751, 688, 538 $cm^{-1}$. MS: m/z 761($M^+$). UV-Vis (methanol)$\lambda_{max}$: 674 nm.

Example 3

Synthesis of Central Metal-free Tetra-t-butyl-phthalocyanine Using 4-Tert-butyl-phthalonitrile 4-tert-butyl phthalonitrile (0.5 g, 2.72 mmol) was placed in a quartz vessel. After addition of 5 ml DBU, the quartz vessel was irradiated in a microwave oven at 440 W for 10 minutes, and a mixture of toluene and water (1:2 v/v) was added to precipitate the product. After filtering and drying, the product was Soxhlet extracted with methanol. 0.4144 g of central metal-free phthalocyanine ($H_2Pc$) was obtained. The yield was 83%.

IR (KBr); 2955, 1616, 1456, 1361, 1316, 1254, 1182, 1007, 869, 823, 743, 518 $cm^{-1}$. MS: m/z 740 ($M^+$). UV-Vis (THF)$\lambda_{max}$: 673 nm.

Example 5

Synthesis of Lu Tetra-t-butyl-diphthalocyanine Through Metal Replacement

Central metal-free tetra-t-butylphthalonitrile (0.2 g, 0.27 mmol) and lutetium acetate (0.0953 g, 0.27 mmol) were ground homogeneously and the resulting mixture was placed in a quartz vessel. 3 ml of DBU was added to the vessel, and the vessel was irradiated in a microwave oven at 440 W for 10 minutes. A mixture of methanol and water (1:2 v/v) was added to wash the product. After filtering and drying, 0.1581 g of Lu tetra-t-butylphthalocyanine was obtained. The yield was 71%.

IR (Kbr): 2956, 1637, 1608, 1482, 1455, 1362, 1315, 1275, 1253, 1223, 1194, 1140, 1077, 1043, 1023, 915, 822, 749, 673, 531, 505 $cm^{-1}$. MS: m/z 1649($M^+$). UV-Vis (n-hexane)$\lambda_{max}$: 676 nm.

Spectra of Various Phthalocyanines

Table 1 exhibits characteristic absorption peaks in UV/Vis spectra of various mentioned above phthalocyanines obtained in examples mentioned above. Owing to the unique chemical structure, phthalocyanine exhibits specific optical characteristics. From the UV/Vis spectra, it is clear that two main strong absorption regions were present, namely, Q region around 670 nm and B region around 340 nm. Both of the two regions are related to $\pi$-$\pi$* transition and the resonance on their rings.

Table 1. Characteristic absorption peaks in UV/Vis spectra of various lab-made phthalocyanines

TABLE 1

| Name | Q region | B region | Name | Q region | B region | Name | Q region | B region |
| --- | --- | --- | --- | --- | --- | --- | --- | --- |
| CoPc | 664 | 331 | ZnPc | 673 | 337 | $TbPc_2$ | 684 | 347 |
| NiPc | 665 | 332 | $DyPc_2$ | 675 | 346 | $LuPc_2$ | 676 | 346 |
| CuPc | 670 | 334 | PdPc | 657 | 329 | $LaPc_2$ | 647 | 334 |
| MgPc | 674 | 348 | SnPc | 684 | 341 | $H_2Pc$ | 696, 659 | 340 |

Solubilities of Various Phthalocyanines

Table 2 displays a solubility of various lab-made phthalocyanines, wherein: ⊙, soluble (>3 wt. %); ○, slightly soluble (1 wt. %~3 wt. %); Δ, hardly soluble (<1 wt. %).

TABLE 2

| Name | toluene | THF | n-hexane | acetone | methanol |
|------|---------|-----|----------|---------|----------|
| $H_2Pc$ | ■ | △ | △ | △ | △ |
| ZnPc | ◎ | ◎ | ○ | △ | △ |
| MgPc | ◎ | ◎ | ○ | ○ | △ |
| CoPc | ○ | ○ | △ | ○ | △ |
| CuPc | ○ | ○ | △ | △ | △ |
| NiPc | ○ | ○ | △ | ○ | △ |
| $TbPc_2$ | ○ | ○ | ■ | ○ | △ |
| $LaPc_2$ | ◎ | ◎ | ◎ | ◎ | △ |

The Correlation of Reaction Condition with Yield of Phthalocyanine

Table 3 sets forth the reaction condition used in various example and yields of phthalocyanine prepared.

TABLE 3

| Name | Starting material | Microwave power (w) | Reaction time (minute) | Yield (%) |
|------|-------------------|---------------------|-----------------------|-----------|
| CuPc | t-butyl-phthalic anhydride | 440 | 10 | 47 |
| MgPc | t-butyl phthalonitrile | 440 | 10 | 85 |
| $H_2Pc$ | t-butyl phthalonitrile | 440 | 10 | 83 |
| ZnPc | tetra-t-butylphthalocyanine | 440 | 10 | 29 |
| $LuPc_2$ | tetra-t-butylphthalocyanine ($H_2Pc$) | 440 | 10 | 71 |

ADVANTAGES OF THE INVENTION

The invention provides several advantages as follows:
1. Due to the unique property of heating associated with microwave irradiation instead of heating in a condition and convection fashion involved in conventional synthesis, undue heat energy consumption can be lowered;
2. Since the operation of microwave field may cause dipolar rotation of reacting molecules, and hence increase the collision frequency and the effective collision probability, the reaction time can be reduced drasticaly from 8~24 hours to 10~30 minutes and the yield can be raised;
3. It can produce a phthalocyanine that is soluble in an organic solvent and can be used to fabricate elements by utilizing the convenient spin-coating method instead of an expensive vacuum sputtering method, and thus increase its industrial practicability; and
4. Since no organic solvent is involved in the reaction according to the invention, the disposal of organic waste can be greatly reduced and the impact on the environment can be largely avoided.

Many changes and modifications in the above-described embodiment of the invention can, of course, be carried out without departing from the scope thereof. Accordingly, to promote the progress in science and the useful arts, the invention is disclosed and is intended to be limited only by the scope of the appended Claims.

REFERENCES

1. P. N. Moskalev et al. 1979, *Russian Journal of Inorganic Chemistry*, 24, 2, 188.
2. K. Takeshita et al. 1991. *Bull. Chem.Soc.Jpn.*, 64, 1167.
3. P. Kivits et al. 1981. *Applied Physics*, A26, 101.
4. M. F. Dautartas et al. 1985, *Applied Physics*, A36, 71.
5. Y. Q. Liu et al. 1998, *Supramolecular Science*, 5, 507.
6. J. Silver et al. 1997. *IEEE Proc. Circuits Devices Syst.*, 144,2, 123.
7. Hari Singh Nalwa et al. 1995. *Thin Solid Films*, 254, 218.
8. K. Petritsch et al. 1999. *Synthetic Metals*, 102, 1776.
9. S. Caddick. 1995. *Tetrahedron*, 51, 10403.
10. Andre Loupy et al. 1998. *Synthesis*, 1213.
11. M. H. Young, et al. 1998. *Chemistry*, 56, 4, 269.
12. Ahmad Shaabani. 1998. *J. Chem. Research*, 672.
13. Cezar Ungurenasu. 1999. *Synthesis*, 10, 1729.

We claim:

1. A method for preparing a phthalocyanine composition by microwave irradiation in the absence of an organic solvent, comprising the steps of:

a. establishing an initial composition from the group consisting of a metal phthalocyanine or a metal-free phthalocyanine, wherein said metal-free phthalocyanine includes a central H atom;

b. establishing a second composition from the group consisting of metal chlorides or acetates;

c. mixing said initial and second compositions to form a third composition;

d. grinding said third composition to form a homogeneous powder composition;

e. placing said homogeneous powder composition into a vessel;

f. irradiating said homogeneous powder composition in said vessel in a microwave oven until a reaction is completed to form said phthalocyanine composition; and g. cleansing said phthalocyanine composition.

2. The method of claim 1, wherein said metal phthalocyanine includes a central metal atom selected from the group consisting of Co, Ni, Cu, Mg, Al, Pd, Sn, Tb, Lu, Ce, La, and Zn.

3. The method of claim 1, wherein said initial composition is selected from the group consisting of t-butyl-phthalic anhydride, t-butyl-phthalonitrile, and metal-free tetra-t-butyl-phthalocyanine $H_2Pc$.

4. The method of claim 1, wherein microwave irradiation is 200–900 W.

5. The method of claim 1, wherein said reaction is completed in 1–30 minutes.

* * * * *